United States Patent
Darling

(10) Patent No.: US 8,623,568 B2
(45) Date of Patent: Jan. 7, 2014

(54) FUEL CELL AND FLOW FIELD PLATE WITH FLOW GUIDES

(75) Inventor: Robert Mason Darling, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/259,245

(22) PCT Filed: Apr. 3, 2009

(86) PCT No.: PCT/US2009/039411
§ 371 (c)(1),
(2), (4) Date: Sep. 23, 2011

(87) PCT Pub. No.: WO2010/114556
PCT Pub. Date: Oct. 7, 2010

(65) Prior Publication Data
US 2012/0015274 A1  Jan. 19, 2012

(51) Int. Cl.
*H01M 8/04* (2006.01)
(52) U.S. Cl.
USPC .......................................... 429/444; 429/443
(58) Field of Classification Search
USPC ........................................................ 429/444
See application file for complete search history.

(56) References Cited

U.S. PATENT DOCUMENTS

2008/0063919 A1   3/2008  Yang et al.

FOREIGN PATENT DOCUMENTS

JP        2006278247 A  * 10/2006
KR    102008002812     *  3/2008

OTHER PUBLICATIONS

International Preliminary Report on Patentability mailed on Oct. 13, 2011 for PCT/US2009/039411.
Search Report and Written Opinion mailed on Nov. 26, 2009 for PCT/US2009/039411.

* cited by examiner

*Primary Examiner* — Barbara Gilliam
*Assistant Examiner* — Gary Harris
(74) *Attorney, Agent, or Firm* — Carlson, Gaskey & Olds, P.C.

(57) ABSTRACT

A flow field plate for use in a fuel cell includes a non-porous plate body having a flow field with a plurality of channels extending between a channel inlet end and a channel outlet end, a first flow distribution portion adjacent the channel inlet end for distributing a fluid to the plurality of channels, and a second flow distribution portion adjacent the channel outlet end for collecting the fluid from the plurality of channels. A first flow guide within the first flow distribution portion establishes a desired flow distribution to the plurality of channels, and a second flow guide within the second flow distribution portion establishes a desired flow distribution from the plurality of channels.

19 Claims, 2 Drawing Sheets

FUEL CELL AND FLOW FIELD PLATE WITH FLOW GUIDES

BACKGROUND OF THE DISCLOSURE

This disclosure relates to flow field plates in a fuel cell. Fuel cells typically include an anode catalyst, a cathode catalyst, and an electrolyte between the anode and cathode catalysts for generating an electric current in a known electrochemical reaction between reactants, such as fuel and oxidant. The fuel cell may include flow field plates with channels for directing the reactants to the respective catalyst. Conventional fuel cells utilize inlet and exit manifolds that extend through the flow field plates to deliver the reactant gases and coolant to the channels and receive exhaust gas and coolant from the channels. The flow field plates are typically rectangular.

The locations of the manifolds often necessitate a multi-pass flow field design in which a reactant flows from one side of the flow field to the other through a first set of channels and turns to flow back across the flow field in another set of channels to make at least several passes over the flow field. One challenge associated with a multi-pass design is achieving high fuel cell performance. For instance, the concentration, temperature, and other properties of the reactant gases change significantly through the channels and can diminish the performance of the fuel cell. Single pass designs with specific arrangements among the fuel, air, and coolant streams have been proposed as a solution to reduce changes in the concentration and temperature of the gases, for example. However, single pass designs do not provide adequate distribution of the reactant gases to the catalyst to achieve the desired performance with the given packaging and manifold location constraints.

SUMMARY OF THE DISCLOSURE

An exemplary flow field plate for use in a fuel cell includes a non-porous plate body having a flow field with a plurality of channels extending between a channel inlet end and a channel outlet end, a first flow distribution portion adjacent the channel inlet end for distributing a fluid to the plurality of channels, and a second flow distribution portion adjacent the channel outlet end for collecting the fluid from the plurality of channels. A first flow guide within the first flow distribution portion establishes a first mass transport rate of the reactant gas to an adjacent catalyst, and a second flow guide within the second flow distribution portion establishes a second, different mass transport rate of the reactant gas to the catalyst.

An exemplary fuel cell may include the flow field plate, an electrode assembly including an electrolyte between an anode catalyst and a cathode catalyst, and a plurality of manifolds for transporting fluids in the fuel cell.

An exemplary method of managing delivery of the reactant gas in the fuel cell includes establishing a first mass transport rate of the reactant gas from the first flow distribution portion to the electrode assembly, and establishing a second, different mass transport rate of the reactant gas from the second flow distribution portion to the electrode assembly.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
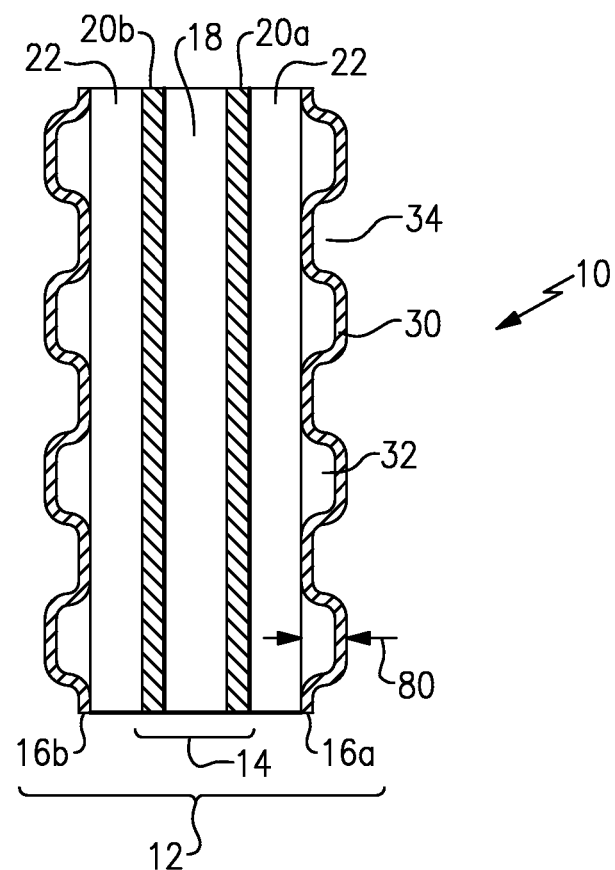
FIG. 1 illustrates an example fuel cell.

FIG. 1 illustrates a partially exploded view of selected portions of an example fuel cell 10 for generating an electric current in a known electrochemical reaction between reactant gases, for example. It is to be understood that the disclosed arrangement of the fuel cell 10 is only an example and that the concepts disclosed herein may be applied to other fuel cell arrangements.

The example fuel cell 10 includes one or more fuel cell units 12 that may be stacked in a known manner to provide the assembly of the fuel cell 10. Each of the fuel cell units 12 includes an electrode assembly 14 and flow field plates 16a and 16b for delivering reactant gases (e.g., air and hydrogen) to the electrode assembly 14. The flow field plate 16a may be regarded as an air plate for delivering air and the flow field plate 16b may be regarded as a fuel plate for delivering hydrogen. The flow field plate 16a, flow field plate 16b, or both may also circulate coolant (in coolant channels 34) for maintaining a desired operating temperature of the fuel cell 10 and hydrating the reactant gases indirectly by maintaining the electrode assembly 14 in a desired temperature range.

The electrode assembly 14 includes an electrolyte 18 between a cathode catalyst 20a and an anode catalyst 20b. Gas diffusion layers 22 may be used between the respective flow field plates 16a and 16b and the electrode assembly 14 to facilitate distribution of the reactant gases.

The flow field plates 16a and 16b may be substantially similar. Thus, the disclosed examples made with reference to the flow field plate 16a may also apply to the flow field plate 16b. In other examples, the flow field plate 16b may be different or include some of the same features as the flow field plate 16a.

The flow field plate 16a includes a non-porous plate body 30. Non-porous refers to the body being solid and free of pores that are known in porous plates for holding or transporting liquid water or other fluids. Thus, the non-porous plate body 30 is a barrier to fluids.

The non-porous plate body 30 includes reactant gas channels 32 and coolant channels 34. The reactant gas channels 32 are located on a side of the flow field plate 16a that faces in the direction of the electrode assembly 14 in the fuel cell unit 12 and the coolant channels 34 are located on the opposite side of the flow field plate 16a.

The flow field plate 16a may be stamped or otherwise formed into the desired shape. In this regard, positive features on one side of the flow field plate 16a are negative features on the other side, and vice versa. Stamping allows the flow field plate 16a to be made at a relatively low cost with a reduced need for machining operations, for example. The flow field plate 16a may be formed from steel, such as stainless steel, or other suitable alloy or material.

Figure 2:
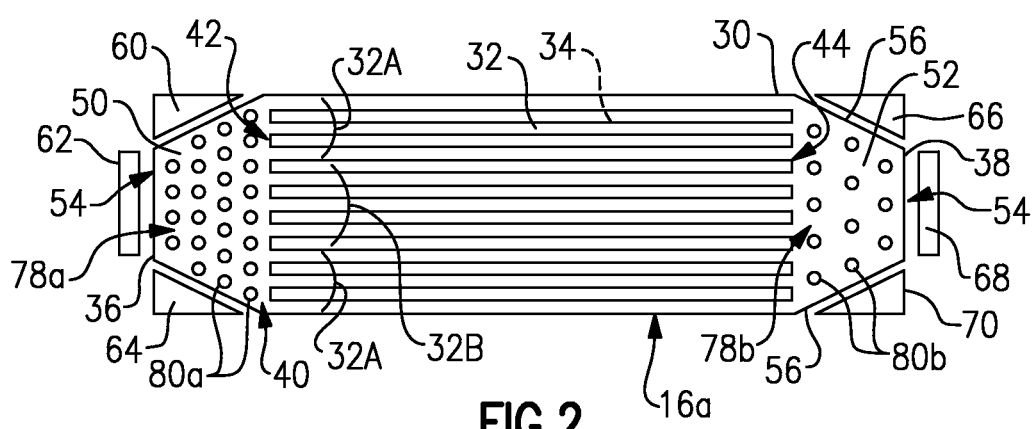
FIG. 2 illustrates an example flow field plate having first and second flow distribution portions with respective first and second flow guides having different population densities of protrusions.

FIG. 2 illustrates one side of the flow field plate 16a. It is to be understood that the other side is the negative of the visible side. The channels 32 and 34 include inlets 42 for receiving a fluid (reactant gas or coolant) and outlets 44 for discharging the fluid.

The flow field plate 16a extends between a first terminal end 36 and a second terminal end 38 of the non-porous plate body 30 and includes flow fields 40 (one shown). The term "flow field" as used in this disclosure may refer to any or all of the channels 32 and 34 for delivering the air, fuel, and coolant and any other area between the channels 32 and 34 and manifolds for transporting the air, fuel, or coolant, such as the manifolds 62 and 68 in the case of air. The reactant gas channels 32 may be regarded as a flow field for the reactant gas (air in the case of flow field plate 16a and fuel in the case of flow field plate 16b) and the coolant channels 34 may be regarded as a flow field for coolant.

The flow fields 40 may each include a first flow distribution portion 50 and a second flow distribution portion 52. The flow fields of the reactant gases are active areas that are side by side with the electrode assembly 14, for delivering the reactant gases to the electrode assembly 14 for the electrochemical reaction. Thus, the first flow distribution portion 50 and the second flow distribution portion 52 are also side by side with a portion of the electrode assembly 14. In the illustrated example, the first flow distribution portion 50 diverges from the first terminal end 36 to the channel inlets 42, and the second first flow distribution portion 52 converges from the channel outlets 44 to the second terminal end 38.

The flow field plate 16a includes another first flow distribution portion 50 and another second flow distribution portion 52 (as the negatives) on the back side of the flow field plate 16a for distributing the coolant to and from the coolant channels 34.

In the illustrated example, the flow field plate 16a has an irregular octagonal shape to achieve the divergent and convergent shape. However, the shape is not limited to octagonal, and in other examples the flow field plate 16a may have a different polygonal shape or a non-polygonal shape, such as elliptical, to achieve the divergent and convergent shape.

The first flow distribution portion 50 and the second flow distribution portion 52 may each include a straight end wall 54 and two straight side walls 56 that non-perpendicularly extend from the straight end wall 54. The angle between the side walls 56 and the end wall 54 provides the respective diverging or converging shape. The angles shown may be varied, depending on a desired degree of divergence or convergence.

The diverging and converging shapes of the respective first flow distribution portion 50 and second flow distribution portion 52 facilitate distribution of a fluid to the given flow field 40. For instance, the flow of a fluid delivered into the first flow distribution portion 50 follows along the side walls 56 to the outer channels near the edges of the flow field plate 16a. Likewise, the second flow distribution portion 52 converges and thereby funnels the fluid flowing from the channels to facilitate collection of the fluid.

The fuel cell 10 also includes manifolds 60, 62, 64, 66, 68, and 70 to deliver and collect reactant gas and coolant to and from the flow fields 40. The manifolds 60 and 64 are located near the side walls 56 of the first flow distribution portion 50, and the manifold 62 is located near the end wall 54. The manifolds 66 and 70 are located near the side walls 56 of the second flow distribution portion 52, and the manifold 68 is located near the end wall 54.

The individual manifolds 60, 62, 64, 66, 68, and 70 may be used as inlets for delivering the fuel, air, or coolant to a given flow field 40 or as outlets for collecting the fuel, air, or coolant from the given flow field 40 to facilitate fluid distribution or achieve other fuel cell objectives.

The first flow distribution portion 50 includes a first flow guide 78a for establishing a first mass transport rate of the reactant gas to the electrode assembly 14 (e.g., transport of air to the cathode catalyst 20a in the case of flow field plate 16a). The second flow distribution portion 52 includes a second flow guide 78b for establishing a second, different mass transport rate of the reactant gas to the electrode assembly 14 (also the cathode catalyst 20a in the case of flow field plate 16a). For example, the first flow guide 78a may include first protrusions 80a within the first flow distribution portion 50, and the second flow guide 78b may include second protrusions 80b within the second flow distribution portion 52.

The first flow guide 78a also establishes a desired flow distribution between a given manifold 60, 62, 64 and the channels. The second flow guide 78b also establishes a desired flow distribution between a given manifold 66, 68, or 70 and the channels 32.

The manifold 62 may deliver a reactant gas into the first flow distribution portion 50. Although this example is made with reference to manifold 62, it is to be understood that the example may also apply to the other manifolds 64 and 66. In this case, the manifold 62 is not equidistantly spaced from the inlets 42 of the reactant gas channels 32. Therefore, the reactant gas channels 32A located towards the outside of the flow field plate 16a are farther away from the manifold 62 than the reactant gas channels 32B in the center. The distances from the manifold 62 to the reactant gas channels 32 causes a tendency for non-uniform flow of the reactant gas into the reactant gas channels 32, which could diminish the performance of the fuel cell 10. However, the first flow guide 78a counteracts the tendency by limiting flow to the closer channels 32B and promoting flow to the farther channels 32A to provide a more uniform flow into the reactant gas channels 32. A uniform flow into the reactant gas channels 32 provides the benefit of increased performance of the fuel cell 10 in a single-pass design.

The manifold 68 may collect the reactant gas from the second flow distribution portion 52. Although this example is made with reference to manifold 68, it is to be understood that the example may also apply to the other manifolds 66 and 70. The reactant gas channels 32A located towards the outside of the flow field plate 16a are farther away from the manifold 68 than the reactant gas channels 32B in the center. The distances from the manifold 62 to the reactant gas channels 32 causes a tendency for non-uniform flow of the reactant gas from the reactant gas channels 32 to the manifold 68, which could diminish the performance of the fuel cell 10. However, the second flow guide 78b counteracts the tendency by limiting flow from the closer channels 32A and promoting flow from the farther channels 32B to provide a more uniform flow into the manifold 68. The shape of the first and second protrusions 80a and 80b, arrangement of the first and second protrusions 80a and 80b, or both may contribute to limiting flow to or from selected reactant gas channels 32B and promoting flow to or from other of the reactant gas channels 32A. Given this description, one of ordinary skill in the art will recognize particular shapes and arrangements to suit their particular needs.

In the illustrated example, the first flow guide 78a includes a first population density of the first protrusions 80a and the second flow guide 78b includes a second population density of the second protrusions 80b that is different than the first population density. The term "population density" refers to the number of first or second protrusions 80a or 80b per unit area of the respective first or second flow distribution portion 50 or 52. In this case, the first population density is greater than the second population density.

Although the flow guides 78a and 78b facilitate uniform flow, the flow guides 78a and 78b limit the mass transport rate of the reactant gas to the electrode assembly 14 by occupying a portion of the open space of the respective first and second flow distribution portions 50 and 52. That is, the protrusions 78a and 78b generally reduce the available surface area of the flow field 40 through which the reactant gas can diffuse to the electrode assembly 14.

In the first flow distribution portion 50 the concentration of the reactant gas (oxygen in the air in the case of flow field plate 16a) is relatively high. However, the concentration of the reactant gas in the second flow distribution portion 52 is relatively low because of oxygen consumption through the reactant gas channels 32. Therefore, the electrode assembly 14 requires more air at the second flow distribution portion 52 to avoid limiting the electrochemical reaction because of the lower oxygen concentration.

In the illustrated example, the higher first population density in the first flow distribution portion 50 provides a first mass transport rate and the lower second population density in the second flow distribution portion 52 provides a second, higher mass transport rate to counteract the lower oxygen concentration. A low oxygen concentration in combination with a lower mass transport rate would limit the electrochemical reaction. Thus, the flow guides 78a and 78b facilitate flow to and from the channels and establish desirable mass transport rates for maintaining the electrochemical reaction given the different reactant gas concentrations in the first and second flow distribution portions 50 and 52.

Additionally, the electrode assembly 14 requires relatively high electron mobility given the higher oxygen concentration at the first flow distribution portion 50. Conversely, the electrode assembly 14 requires relatively lower electron mobility given the lower oxygen concentration at the second flow distribution portion 52. The higher population density in the first flow distribution portion 50 favors electrical conductivity and thereby facilitates electron mobility to avoid limiting the electrochemical reaction. The lower population density in the second flow distribution portion 52 favors mass transport over electron mobility to avoid limiting the electrochemical reaction.

Figure 3:
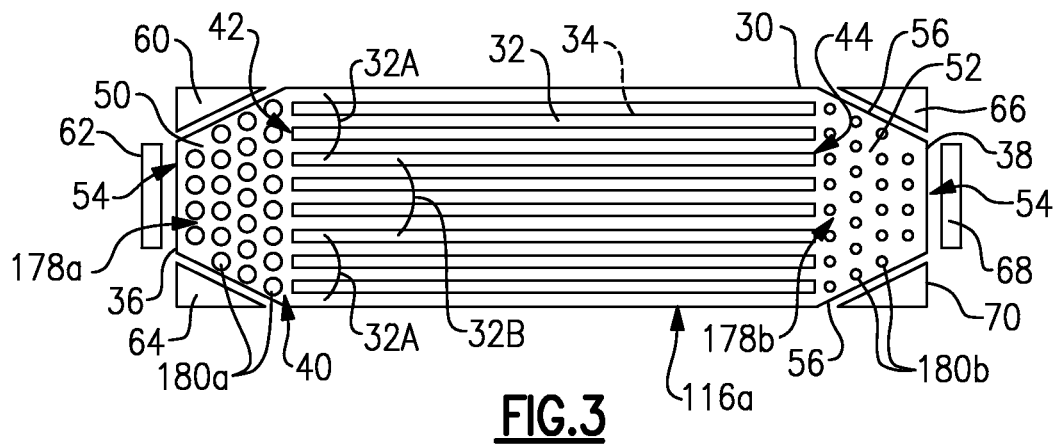
FIG. 3 illustrates another example flow field plate having first and second flow distribution portions with respective first and second flow guides having different sizes.

FIG. 3 illustrates another example flow field plate 116a that may be used in the fuel cell 10 in place of the flow field plate 16a. In this disclosure, like reference numerals designate like elements where appropriate, and reference numerals with the addition of one-hundred or multiples thereof designate modified elements. The modified elements are understood to incorporate the same features and benefits of the corresponding original elements. In this example, the first flow distribution portion 50 includes a first flow guide 178a having first protrusions 180a, and the second flow distribution portion 52 includes a second flow guide 178b having second protrusions 180b. In this case, the population density of the first and second protrusions 180a and 180b are equal but the first protrusions 180a each have a first size and the second protrusions 180b each have a second size that is different than the first size. In the illustrated example, the first size is greater than the second size. The sizes of the first and second protrusions 180a and 180b may refer to the volume, surface area, or other size indicator.

Similar to the higher first population density, the larger size of the first protrusions 180a favors electrical conductivity over mass transport rate in the first flow distribution portion 50 and the smaller second size of the second protrusions 180b in the second flow distribution portion 52 favors mass transport over electron mobility. That is, the protrusions 178a generally provide less available surface area than the second protrusions 178b through which the reactant gas can diffuse to the electrode assembly 14.

Figure 4:
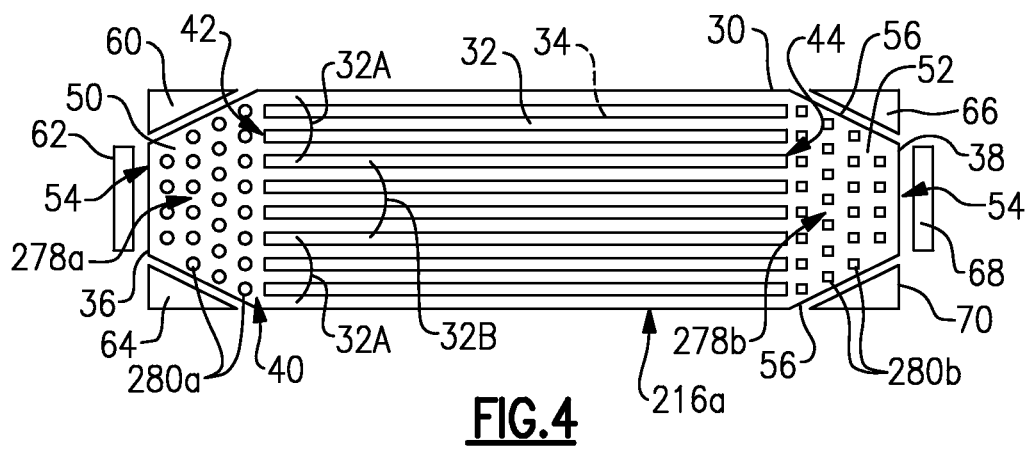
FIG. 4 illustrates another example flow field plate having first and second flow distribution portions with respective first and second flow guides having different shapes.

FIG. 4 illustrates another example flow field plate 216a that may be used in the fuel cell 10 in place of the flow field plate 16a. In this example, the first flow distribution portion 50 includes a first flow guide 278a having first protrusions 280a, and the second flow distribution portion 52 includes a second flow guide 278b having second protrusions 280b. In this case, the population density of the first and second protrusions 180a and 180b are equal and the size may be approximately equal but the first protrusions 280a each have a first shape and the second protrusions 180b each have a second shape that is different than the first shape. Similar to the higher first population density, the shape of the first protrusions 280a favors electrical conductivity over mass transport and the shape of the second protrusions 280b favors mass transport over electron mobility. In this regard, the selected shape of the protrusions 278a provides less available surface area than the shape second protrusions 178b through which the reactant gas can diffuse to the electrode assembly 14.

Figure 5:
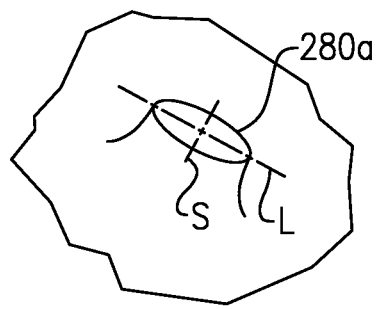
FIG. 5 illustrates an example protrusion of a flow guide in a flow distribution portion of a flow field plate.

FIG. 5 illustrates an example of one of the first protrusions 280a. It is to be understood that the protrusions 80a, 180a, 80b, and 180b may have a similar shape as the protrusion 280a. In this example, the protrusion 280a has a non-equiaxed cross-sectional shape, with a long axis L and short axis S. The long axes L of the protrusions 280a in the first flow distribution portion 50 may be parallel. In this example, the protrusions 280a have an oval cross-section, but in other examples the protrusions 280a may have other cross-sectional shapes.

The non-equiaxed cross-sectional shape of the protrusions 280a limits flow along the S-axis direction and promotes flow along the L-axis. For instance, the reactant gas flows around the protrusions 280a. The protrusion 280a provides less obstruction to flow along the direction of the long axis L than along the direction of the short axis S because the protrusions 280a are relatively narrow along the short axes S and relatively wide along the long axes L. In the case of the flow field plate 216a, the second protrusions 280b have a different shape than the first protrusions 280a. The protrusions 280a may be designed with an orientation that limits flow to or from closer channels 32B and promotes flow to or from farther channels 32A to provide a more uniform flow distribution.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A flow field plate for use in a fuel cell, comprising:
   a non-porous plate body including a flow field having a plurality of channels extending between a channel inlet end and a channel outlet end, a first flow distribution portion adjacent the channel inlet end for distributing a reactant gas to the plurality of channels, and a second flow distribution portion adjacent the channel outlet end for collecting the reactant gas from the plurality of channels;

a first flow guide within the first flow distribution portion for establishing a first mass transport rate of the reactant gas to an adjacent catalyst, the first flow guide including a plurality of first protrusions; and a second flow guide within the second flow distribution portion for establishing a second, different mass transport rate of the reactant gas to the adjacent catalyst, the second flow guide including a plurality of second protrusions, the plurality of first protrusions collectively differing from the plurality of second protrusions in at least one of population density, surface area and volume.

2. The flow field plate as recited in claim 1, wherein each of the plurality of first protrusions has a first geometric shape and each of the plurality of second protrusions has a second geometric shape that is different than the first geometric shape.

3. The flow field plate as recited in claim 1, further including a first population density of the plurality of first protrusions represented as a number of the first protrusions per unit area and a second population density of the plurality of second protrusions represented as a number of the second protrusions per unit area, wherein the second population density is different than the first population density.

4. The flow field plate as recited in claim 3, wherein the first population density is greater than the second population density.

5. A fuel cell comprising:
an electrode assembly including an electrolyte between an anode catalyst and a cathode catalyst;
a plurality of manifolds for transporting fluids in the fuel cell;
a non-porous plate body including a flow field having a plurality of channels extending between a channel inlet end and a channel outlet end, a first flow distribution portion adjacent the channel inlet end for distributing a reactant gas to the plurality of channels, and a second flow distribution portion adjacent the channel outlet end for collecting the reactant gas from the plurality of channels;
a first flow guide within the first flow distribution portion for establishing a first mass transport rate of the reactant gas to the electrode assembly, the first flow guide including a plurality of first protrusions; and
a second flow guide within the second flow distribution portion for establishing a second, different mass transport rate of the reactant gas to the electrode assembly, the second flow guide including a plurality of second protrusions, the plurality of first protrusions collectively differing from the plurality of second protrusions in at least one of population density, surface area and volume.

6. The fuel cell as recited in claim 5, wherein the first flow guide includes a plurality of first protrusions and the second flow guide includes a plurality of second protrusions.

7. The fuel cell as recited in claim 6, wherein each of the plurality of first protrusions has a first size and each of the plurality of second protrusions has a second size that is different than the first size.

8. The fuel cell as recited in claim 7, wherein the first size is larger than the second size.

9. The fuel cell as recited in claim 6, wherein each of the plurality of first protrusions has a first shape and each of the plurality of second protrusions has a second shape that is different than the first shape.

10. The fuel cell as recited in claim 6, further including a first population density of the plurality of first protrusions and a second population density of the plurality of second protrusions that is different than the first population density.

11. The fuel cell as recited in claim 10, wherein the first population density is greater than the second population density.

12. The fuel cell as recited in claim 4, further comprising a gas diffusion layer between the non-porous plate body and the electrode assembly.

13. A method of managing delivery of a reactant gas in a fuel cell comprising an electrode assembly having an electrolyte between an anode catalyst and a cathode catalyst, a plurality of manifolds for transporting fluids in the fuel cell, a non-porous plate body including a flow field having a plurality of channels extending between a channel inlet end and a channel outlet end, a first flow distribution portion adjacent the channel inlet end for distributing the reactant gas to the plurality of channels, and a second flow distribution portion adjacent the channel outlet end for collecting the reactant gas from the plurality of channels, a first flow guide within the first flow distribution portion, and a second flow guide within the second flow distribution portion, the method comprising:
establishing a first mass transport rate of the reactant gas from the first flow distribution portion to the electrode assembly using a plurality of first protrusions of the first flow guide; and
establishing a second, different mass transport rate of the reactant gas from the second flow distribution portion to the electrode assembly, using a plurality of second protrusions of the second flow guide, where the plurality of first protrusions collectively differ from the plurality of second protrusions in at least one of population density, surface area and volume.

14. The method as recited in claim 13, wherein the first mass transport rate is less than the second mass transport rate.

15. The flow field plate as recited in claim 1, wherein the plurality of first protrusions collectively differ from the plurality of second protrusions in surface area.

16. The flow field plate as recited in claim 1, wherein the plurality of first protrusions collectively differ from the plurality of second protrusions in volume.

17. The flow field plate as recited in claim 1, wherein the plurality of first protrusions collectively differ from the plurality of second protrusions in population density.

18. The flow field plate as recited in claim 1, wherein the first flow distribution portion converges to the channel inlet end of the flow field and the second flow distribution portion diverges from the channel outlet end of the flow field.

19. The flow field plate as recited in claim 1, wherein the plurality of first protrusions and the plurality of second protrusions include a protrusion having a non-equiaxed cross-sectional shape.

* * * * *